United States Patent [19]
Ibe et al.

[11] Patent Number: 6,155,594
[45] Date of Patent: Dec. 5, 2000

[54] AIR BAG APPARATUS

[75] Inventors: Shoichi Ibe, Niwa-gun; Kentaro Iwanaga, Anjyo, both of Japan

[73] Assignees: Kabushiki Kaisha Tokai-Rika-Denki-Seisakusho, Toyota; Inoac Corporation, Nagoya, both of Japan

[21] Appl. No.: 09/170,120

[22] Filed: Oct. 13, 1998

[30] Foreign Application Priority Data

Oct. 16, 1997 [JP] Japan .................................. 9-283866

[51] Int. Cl.⁷ .................................................. B60R 21/22
[52] U.S. Cl. ........................................ 280/728.2; 280/730.2
[58] Field of Search ............................ 280/730.2, 730.1, 280/728.2

[56] References Cited

FOREIGN PATENT DOCUMENTS 9-254736  9/1997  Japan .

Primary Examiner—Paul N. Dickson
Attorney, Agent, or Firm—Oliff & Berridge, PLC

[57] ABSTRACT

A garnish for housing an air bag in a folded state is mounted in such a manner as to enable the housed air bag to move from a housing position of the air bag near a frame member to a position spaced apart therefrom so as to be inflatable outwards, so that the air bag can expand toward the inside of a vehicle from a portion between the moved garnish and the frame member at the time of inflation of the air bag.

16 Claims, 8 Drawing Sheets

AIR BAG APPARATUS

BACKGROUND OF THE INVENTION

1. Field of the Invention

The present invention relates to an air bag apparatus which inflates a bag body between a fixing member in a side of a vehicle body and an occupant.

2. Description of the Related Art

Conventionally, there has been suggested an air bag apparatus which is mounted on a vehicle and which inflates an air bag between a side portion of a vehicle body and an occupant of the vehicle so as to support the head of the occupant at the time of a collision in the side (a side collision) of the vehicle or the like, and absorbs the kinetic energy of the head of the occupant.

For example, the air bag apparatus is disposed in a curved interior portion extending from a front body pillar (a so-called A-pillar) positioned beside a wind shield towards the roof. The air bag apparatus is structured such that when an acceleration sensor detects a great acceleration from a side direction of the vehicle, the air bag apparatus actuates an inflator and the air bag, inflated and expanded by supplying a high pressure gas generated in the inflator into the air bag, absorbs the kinetic energy of the head of the occupant.

As a vehicle body structure for mounting such an air bag apparatus to the vehicle body, as shown in FIG. 8, there is employed a structure in which a folded air bag 14 is housed within a housing space between a reinforcement 10 curved from a front body pillar towards the roof and an interior garnish 12 fixed to the reinforcement 10 by a nut and screw 11. In this case, an aperture of a recessed portion 12A for fixing the screw in the garnish 12 is closed by a lid member 15.

The garnish 12 having the structure for mounting the air bag on the vehicle body, which is shown in a cross sectional view in a direction perpendicular to a longitudinal direction thereof in FIG. 8, has a cross section formed in a hook shape, so that a housing portion for the air bag 14 is formed therein.

The garnish 12 is structured such that a portion from the portion fixed by the screw 11 to a free end in the cross section thereof is deformed as shown by the imaginary line in the drawing at the time of the inflation and expansion of the air bag 14, so that the air bag 14 is inflated outward by allowing one side portion 12A of the garnish 12 to separate from the reinforcement 10 and to open the housing space outward.

In the air bag apparatus mentioned above, since the portion in a longitudinal direction which includes the curved portion of the garnish 12 is curved, the curved portion of the garnish 12 needs to be deformed by a large amount when the garnish 12 is deformed from having a hook-shaped cross sectional shape so as to be extended to have a linear cross sectional shape, so that a great force has been required for pushing open and deforming the garnish 12 when the air bag 14 inflates and expands.

SUMMARY OF THE INVENTION

Taking the above facts into consideration, an object of the present invention is to newly provide an air bag apparatus which has a simple structure, can be easily processed and manufactured, and mounted on a vehicle body so that an air bag can be rapidly opened and expanded outward by a comparatively weak force when the air bag apparatus is actuated so as to inflate and expand the air bag.

In accordance with a first aspect of the present invention, there is provided an air bag apparatus which absorbs the kinetic energy of an occupant of a vehicle by an air bag which is inflated and expanded by being charged with a gas, comprising:

a cover member for housing the air bag in a folded state;

a fixing element which has an enlarged head portion at one end portion thereof and which is attached to a fixing member at a vehicle body side at the other end portion thereof;

holding portions formed in a hollow cylinder provided on the cover member so that the one end portion of the fixing element is movably inserted into the holding portion;

a partition projecting inwards in the hollow cylinder of the holding portion in such a manner that the partition plate abuts the enlarged end portion of the fixing element when the cover member is positioned for housing the air bag, and the enlarged end portion of the fixing element is disengaged from the partition plate when inflating force of the air bag is applied to the cover member; and a bottom portion, projecting inwards in the hollow cylinder of the holding portion, which is brought into contact with the enlarged end portion of the fixing element when the cover member is moved to a position where the air bag is inflated outward to hold the cover member so as not to be disengaged.

In accordance with the structure mentioned above, when the air bag apparatus is actuated and the air bag starts inflating, the cover member moves so as to be separated from the fixing member at the side of the vehicle body in such a manner that the partition plate in the holding portion is disengaged from the enlarged head portion of the fixing element and the bottom portion is brought into contact with and held by the enlarged head portion of the fixing element. Accordingly, the cover member opens a large aperture for inflating the air bag along the entire body thereof between the cover member and the fixing member in the vehicle body. Further, the inflating air bag rapidly expands outward from a wide gap opened by the motion of the cover member, and inflates and expands to reach a state where it can be used to absorb kinetic energy. Still further, since the air bag according to the present invention has a simple structure as mentioned above, it can be easily manufactured.

In accordance with a second aspect of the present invention, there is provided an air bag apparatus comprising an air bag disposed between an occupant of a vehicle and a side wall of a vehicle so as to inflate on the internal side of the side wall of the vehicle comprising:

a cover member for covering from an interior side the air bag disposed inside the side wall of the vehicle in a contracted state;

a fixing element which has an enlarged head portion at one end portion thereof and which is attached to a fixing member at a vehicle body side at the other end portion thereof;

holding portions formed in a hollow cylinder provided on the cover member so that the one end portion of the fixing element is movably inserted into the holding portion;

a partition projecting inwards in the hollow cylinder of the holding portion in such a manner that the partition plate abuts the enlarged end portion of the fixing element when the cover member is positioned for housing the air bag, and the enlarged end portion of the fixing element is disengaged from the partition plate when inflating force of the air bag is applied to the cover member; and a bottom portion, projecting inwards from the hollow cylinder of the holding portion, which is brought into contact with the enlarged end portion of the fixing element when the cover member is moved to a position where the air bag is inflated outward to hold the cover member so as not to be disengaged.

In accordance with the structure mentioned above, when the air bag apparatus disposed in the side of the interior of the side wall of the vehicle is actuated and the air bag starts inflating, the cover member moves so as to be separated from the fixing member at the side of the vehicle body in such a manner that the partition plate in the holding portion is disengaged from the enlarged head portion of the fixing element and the bottom portion is brought into contact with and held by the enlarged head portion of the fixing element. Accordingly, the cover member opens a large aperture for inflating the air bag along the entire body thereof with respect to the side wall of the vehicle. Further, the inflating air bag rapidly inflates outward from a wide gap opened by the motion of the cover member, and inflates and expands to reach a state where it can be used to absorb kinetic energy. Still further, since the air bag apparatus according to the present invention has a simple structure as mentioned above, it can be easily manufactured.

In accordance with a third aspect of the present invention, there is provided an air bag apparatus which absorbs the kinetic energy of an occupant of a vehicle by an air bag which is inflated and expanded by being charged with a gas ejected from an inflator due to the actuation of the inflator, comprising:

a garnish arranged so as to correspond to a frame member extending from a front body pillar towards the roof in the interior of a vehicle and which houses the air bag in a folded state;

holding members shaped in a hollow cylinder having a bottom portion in a plurality of portions of the garnish and having a partition plate at a position separated from the bottom portion of the hollow cylinder; and a fixing element which is disposed in a state where the fixing element penetrates the bottom portion of the holding member, the partition plate, and the frame member and is disposed in a fixed state where the fixing element abuts the partition plate and the frame member and holds the garnish in an air bag housing position where the garnish contacts the frame member, and when the garnish is separated from the partition plate by the inflating force of the air bag enabling the air bag to expand externally of the air bag housing, the fixing element abuts the bottom portion of the holding member and holds the bottom portion of the holding member and the frame member in a fixed position.

In accordance with the structure mentioned above, in a state where the air bag apparatus is not actuated, the fixing element supports the frame member and the partition plate so as to maintain a predetermined distance between the frame member and the partition plate, so that the garnish maintains a state of housing the air bag.

Next, when the air bag apparatus is actuated and the air bag starts inflating and expanding, the garnish only needs to be pressed by a relatively weak amount of the inflating force before the partition plate is broken down and the garnish moves away from the fixing element. The garnish which is no longer supported moves away from the frame member until the bottom portion of the holding portion is restrained by the fixing part element. Accordingly, the air bag rapidly inflates outward from the wide gap opened between the frame member and the whole of the side portion of the garnish, thereby inflating and expanding. Further, since the air bag apparatus according to the present invention has a simple structure as mentioned above, it can be easily manufactured.

Alternatively, in the air bag apparatus the air bag 22 absorbs the kinetic energy of an occupant of a vehicle by an air bag which is inflated and expanded by being charged with a gas ejected from an inflator due to an actuation of the inflator, the air bag apparatus comprising a garnish 36 arranged so as to correspond to a frame member 38 extending from a front body pillar towards the roof in the interior of a vehicle and which houses the air bag 22 in a folded state, holding members in a hollow cylinder having a bottom portion in a plurality of portions of the garnish, a fixing bolt 94 having a small diameter portion and a large diameter portion to from a stepped portion, wherein the small diameter portion of the fixing bolt penetrates the bottom portion of the holding member and the frame member so as to press and hold the air bag between the bottom portion of the holding member and the frame member by using a nut screwed onto the small diameter portion of the fixing bolt, wherein a plurality of slits are provided in the bottom portion of the holding member so that the bottom portion is broken by the inflating force of the air bag and the garnish is separated from the frame member so as to enable the air bag to expand externally.

In accordance with the structure above, in a state where the air bag apparatus is not actuated, the fixing bolt supports the frame member and the holding member so that the garnish maintains a state of housing the air bag therein, when the air bag apparatus is actuated and the air bag starts inflating and expanding, the bottom portion is broken by a relatively weak amount of the inflating force due to the plurality of slits provided in the bottom portion.

In accordance with a fourth aspect of the present invention, there is provided an air bag apparatus which absorbs the kinetic energy of an occupant of a vehicle by an air bag which is inflated and expanded by being charged with a gas ejected from an inflator due to actuation of the inflator, comprising:

a garnish arranged so as to correspond to a frame member extending from a front body pillar towards the roof in the interior of a vehicle and which houses the air bag in a folded state;

holding portions formed in a hollow cylinder at a plurality of portions of the garnish and having a partition plate at a position separated from a bottom surface aperture formed by reducing the size of the inner diameter of an aperture in the bottom surface of the hollow cylinder;

an assist provided with a foot portion having a bottom portion smaller than the hollow cylinder of the holding portion; and a fixing element which penetrates both the frame member and the air bag thereby fixing both, and which holds the garnish in an air bag housing position where the garnish contacts the frame member, and which penetrates the partition plate and the bottom portion of the assist so as to hold the partition plate and the bottom portion of the assist at a predetermined distance from each other, and when the fixing element is caused by the inflating force of the air bag to no longer be fixed to the partition plate, and the garnish moves to a position where the air bag is able to expand externally of the air bag housing, then the bottom surface aperture abuts the bottom portion of the assist and the fixing element holds the frame member and the bottom surface aperture via the bottom portion of the assist.

In accordance with the structure mentioned above, in a state where the air bag apparatus is not actuated, the fixing element supports the frame member and the partition plate so as to maintain a predetermined distance between the frame member and the partition plate through the bottom portion of the assist, so that the garnish maintains a state of housing the air bag.

Next, when the air bag apparatus is actuated and the air bag starts inflating and expanding, the garnish only needs to be pressed by a relatively weak amount of the inflating force before the partition plate is broken. Then, the garnish moves as it is pressed by the air bag so as to move away from the frame member until the bottom surface aperture is restrained by the bottom portion of the assist. Accordingly, the air bag rapidly inflates outward from the wide gap opened between the frame member and the whole edge of the garnish, thereby inflating and expending.

Further, the air bag maintains a state in which a portion for fixing thereof is always fixed to the frame member by the fixing element. Still further, since the fixing element can be commonly used for fixing both the garnish and the assist, the structure thereof can be made simple. Further, since the air bag apparatus of the present invention has the simple structure mentioned above, it can be easily manufactured.

DESCRIPTION OF THE PREFERRED EMBODIMENTS

An air bag apparatus in accordance with a first embodiment of the present invention will be shown in FIGS. 1 to 4.

Figure 3:
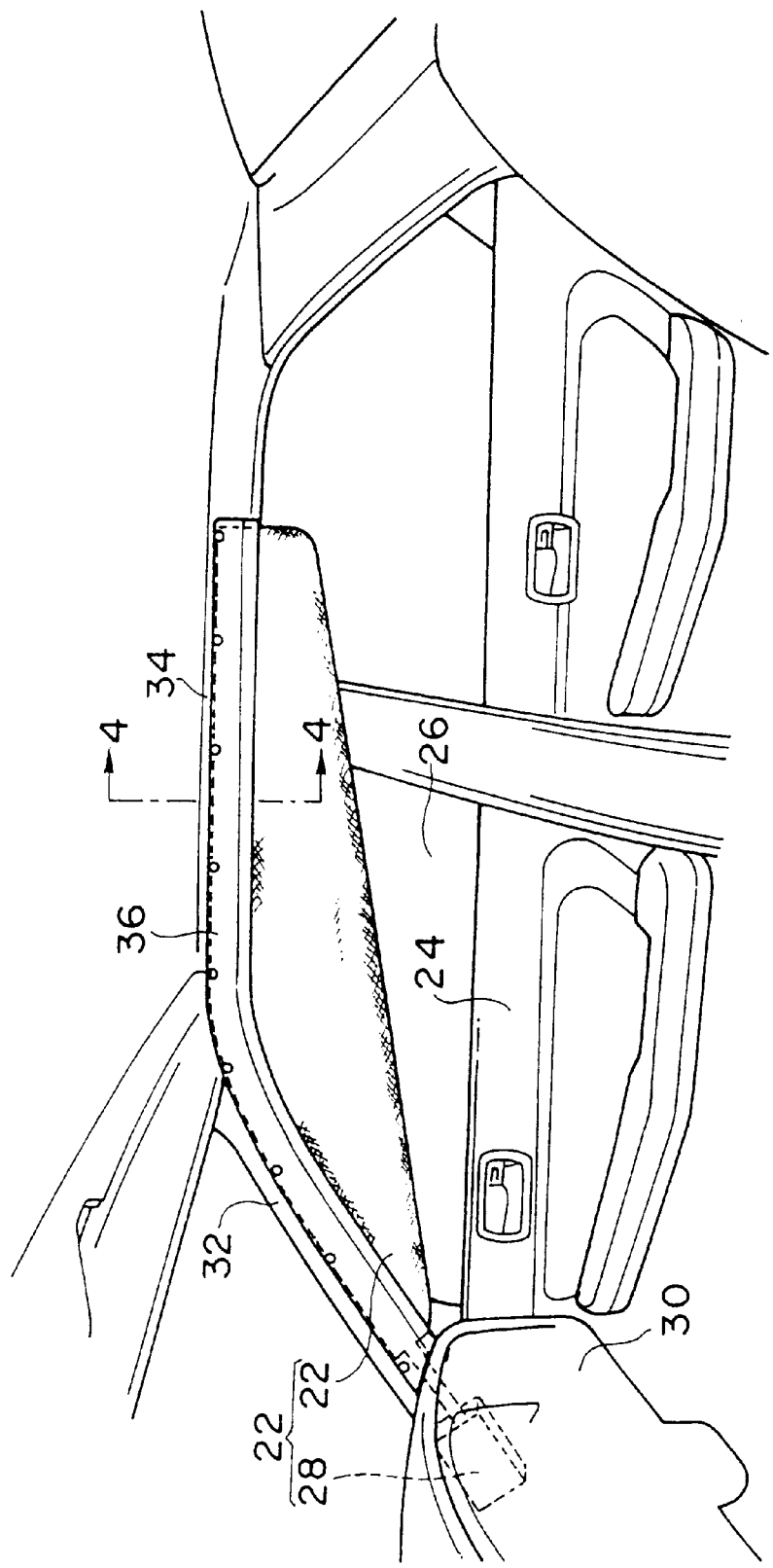
FIG. 3 is a front view of a main portion of the interior of the vehicle which shows a state after the air bag apparatus according to the first embodiment of the present invention has been actuated.

The air bag apparatus 20 is mounted within a vehicle, as shown in FIG. 3, for supporting the head of an occupant of the vehicle or the like and absorbing the kinetic energy thereof by an air bag 22 which is inflated and developed along an upper position of a window 26 of a door 24 beside the driver's seat or front passenger's seat within the interior of the vehicle by being charged with a gas generated from an inflator 28.

For this reason, the inflator 28 of the air bag apparatus 20 is provided inside an instrument panel 30 within the vehicle interior. Further, the air bag 22 connecting a gas introduction port to a nozzle portion of the inflator 28 is accommodated at the back of a garnish 36 formed as a cover member extending from the side of the instrument panel 30 of a front body pillar (an A-pillar) 32 towards a predetermined position at the side of the roof 34.

Figure 1:
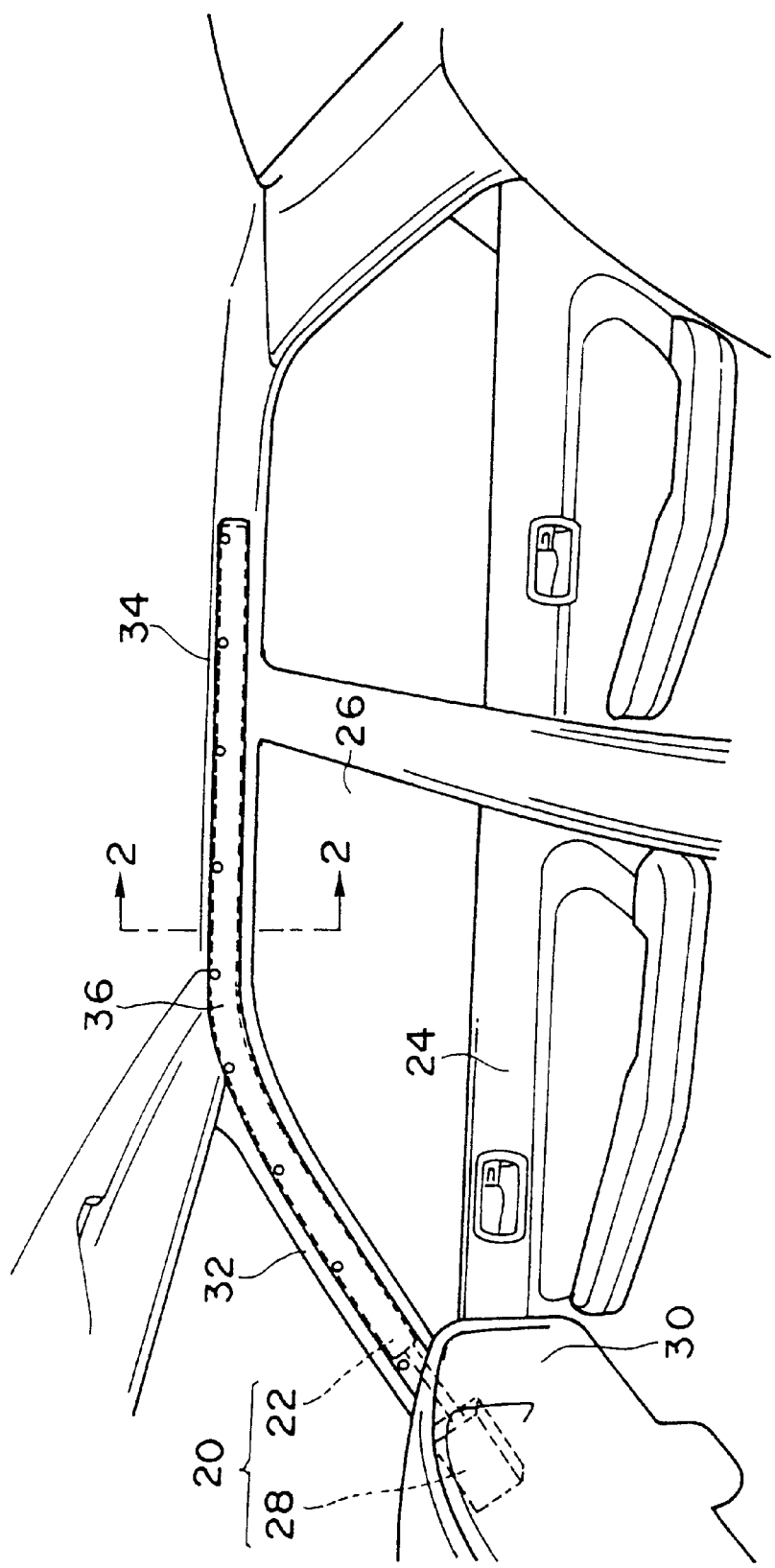
FIG. 1 is a front view of a main portion of an interior of a vehicle which shows a state before an air bag apparatus according to a first embodiment of the present invention is actuated.
Figure 2:
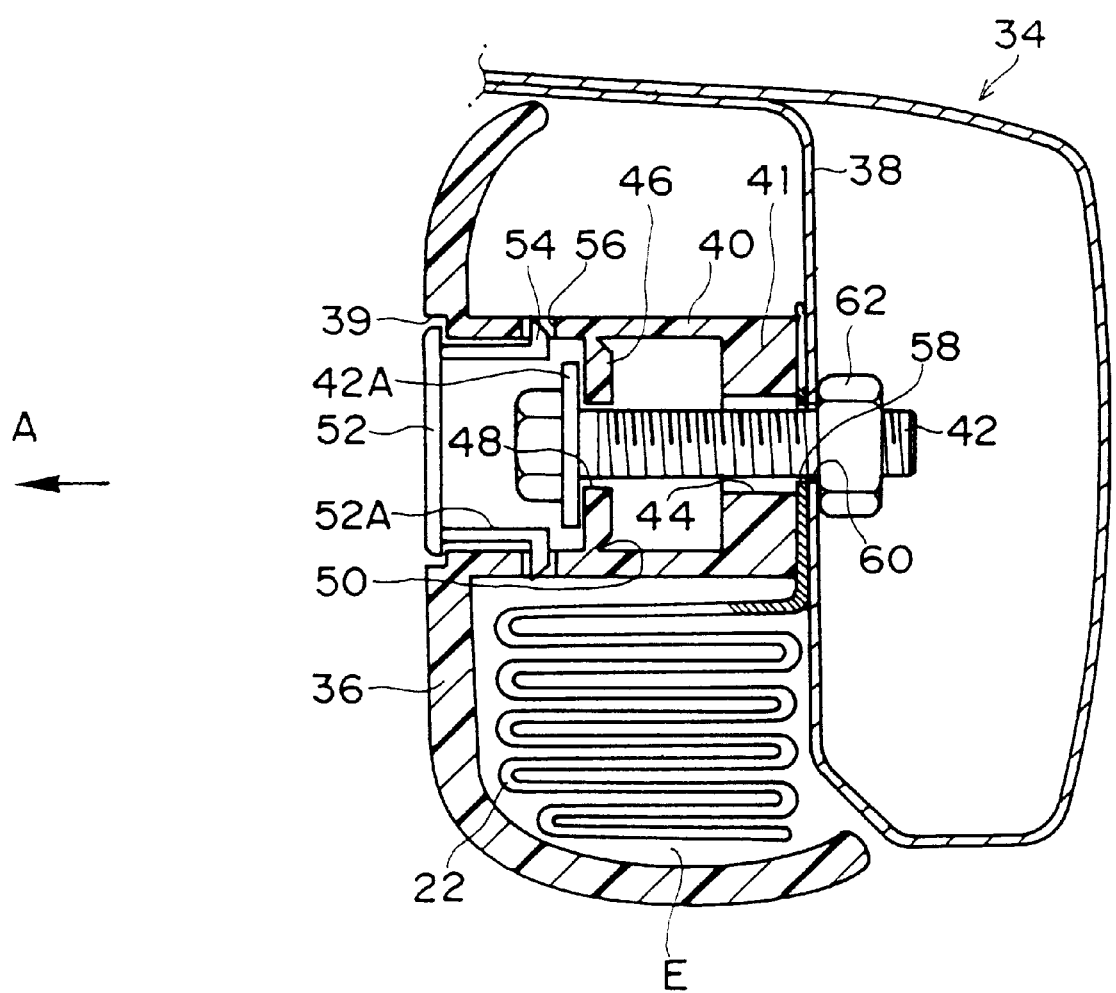
FIG. 2 is an end view of a cross sectional surface along a line 2—2 in FIG. 1.

As shown in FIG. 1, the garnish 36 is formed in an elongated shape partly curved from the front body pillar 32 towards the roof 34. Further, as shown in FIG. 2, the garnish 36 is formed having an L-shaped cross section, and is disposed together with a frame member 38 corresponding to a fixing member at the vehicle body side of the front body pillar 32 so as to form a space E for accommodating the air bag.

As a part of mounting means for supporting and fixing the garnish 36 in such a manner, the garnish 36 can be separated from the frame member 38, a holding member 40 is integrally formed at each of a plurality of predetermined portions in the garnish 36.

The holding member 40 is formed as a hollow cylinder with a bottom extending from an aperture 39 of a surface of the garnish 36 towards the frame member 38 corresponding to the back side thereof. A through hole 44 for inserting a fixing bolt 42 as a fixing element is formed at the center of a bottom portion 41 of the holding member 40.

A partition plate 46 is integrally formed in the holding member 40 to block a cylindrical hole from a predetermined intermediate position in the direction perpendicular to the inner peripheral surface of the cylindrical hole. A through hole 48 having the concentricity with the through hole 44 and the same diameter as that of the through hole 44 is formed at the center of the partition plate 46. Further, a breakable portion 50, at which the partition plate 46 is broken down when a load equal to or more than a predetermined value is applied to the breakable portion 50, is formed at a connecting portion with a thin thickness along an entire periphery thereof between the partition plate 46 and the inner wall of the cylindrical hole. Further, an engagement hole 56, which is a small through hole for engaging an engagement hook 54 of a lid 52 for closing an aperture at the side of the interior of the vehicle in the cylindrical hole, is formed at a predetermined position in the side of the interior of the vehicle spaced from the partition plate 46 within the cylindrical hole in the holding portion 40.

The air bag 22 to be accommodated in the garnish 36 is formed in an elongated bag shape having substantially the same length as that of the garnish 36 as shown in FIG. 3. As shown in FIG. 2, as a structure for fixing the air bag 22 to the vehicle body, a plurality of through holes 58 in the air bag 52 are formed at positions corresponding to through holes 60 formed at predetermined positions in the frame member 38.

In order to mount the air bag 22 and the garnish 36 formed in the manner mentioned above on the vehicle body side, first, the air bag 22 is accommodated within a housing space E of the garnish 36, the through holes 44 are allowed to align with each of the corresponding through holes 58, they are brought into contact with the frame member 38, and the through holes 44 and 58 and the through holes 60 are aligned with each other. Then, the fixing bolt 42 having a flange head 42A, which is an enlarged head portion at one end of the fixing bolt 42, is inserted into the aperture 39 of a hollow cylinder of each holding portion 40 positioned on the interior side of the vehicle from the top end of a threaded portion of the bolt 42, passed through the through hole 48 of the partition plate 46 and further through each of the through holes 44, 58 and 60, and the nut 62 is fitted to the top end of the threaded portion of the bolt 42, thereby fixing these members as shown in FIG. 2. In this fixed state, the flange 42A at the head portion of the fixing bolt 42 is press-contacted with the partition plate 46 and the nut 62 fitted thereto is press-contacted with the frame member 38, so that the air bag 22 is maintained in a housed state in which the holding member 40, the air bag 22 and the frame member 38 are held between the fixing nut 62 and the flange 42A. Further, the garnish 36 may be fixed to the vehicle body by the fixing bolt 42 after the air bag 22 is fixed to the vehicle body by a bag fixing bolt (not shown).

Further, the lid 52 is fitted to an aperture of each of the holding member 40 of the garnish 36 in such a manner as to close the aperture in a state where the aperture is aligned with the surface of the garnish 36, and the lid 52 is mounted by engaging the engagement hook 54 provided on the foot 52A of the lid 52 with the engagement hole 56, thereby improving the external appearance as seen from the inside of the vehicle.

Next, functions and effects of the air bag apparatus according to the first embodiment structured in the manner mentioned above will be described. In a state shown in FIGS. 1 and 2 in which the air bag apparatus mounted on the vehicle is not actuated, the air bag 22 is accommodated within the housing space E partitioned by the garnish 36 in a folded state and stands ready.

In the standby state for the actuation as shown in FIGS. 1 and 2, when a great acceleration equal to or more than a predetermined value is applied to the vehicle, the inflator 28 is actuated in response to an action of an acceleration sensor (not shown) to detect the acceleration, so that the inflator 28 rapidly ejects a gas into the air bag 22. Then, an inflating force when the air bag 22 expands within the housing space E acts so as to separate the garnish 36 and the frame member 38 from each other, and the expansion force is applied to each of the holding members 40. Then, the partition plate 46 in each of the holding members 40 which has received the inflating force is broken down at the breakable portion 50 having a weak amount of strength, and thus disengaged from the flange portion 42A of the fixing bolt 42.

Figure 4:
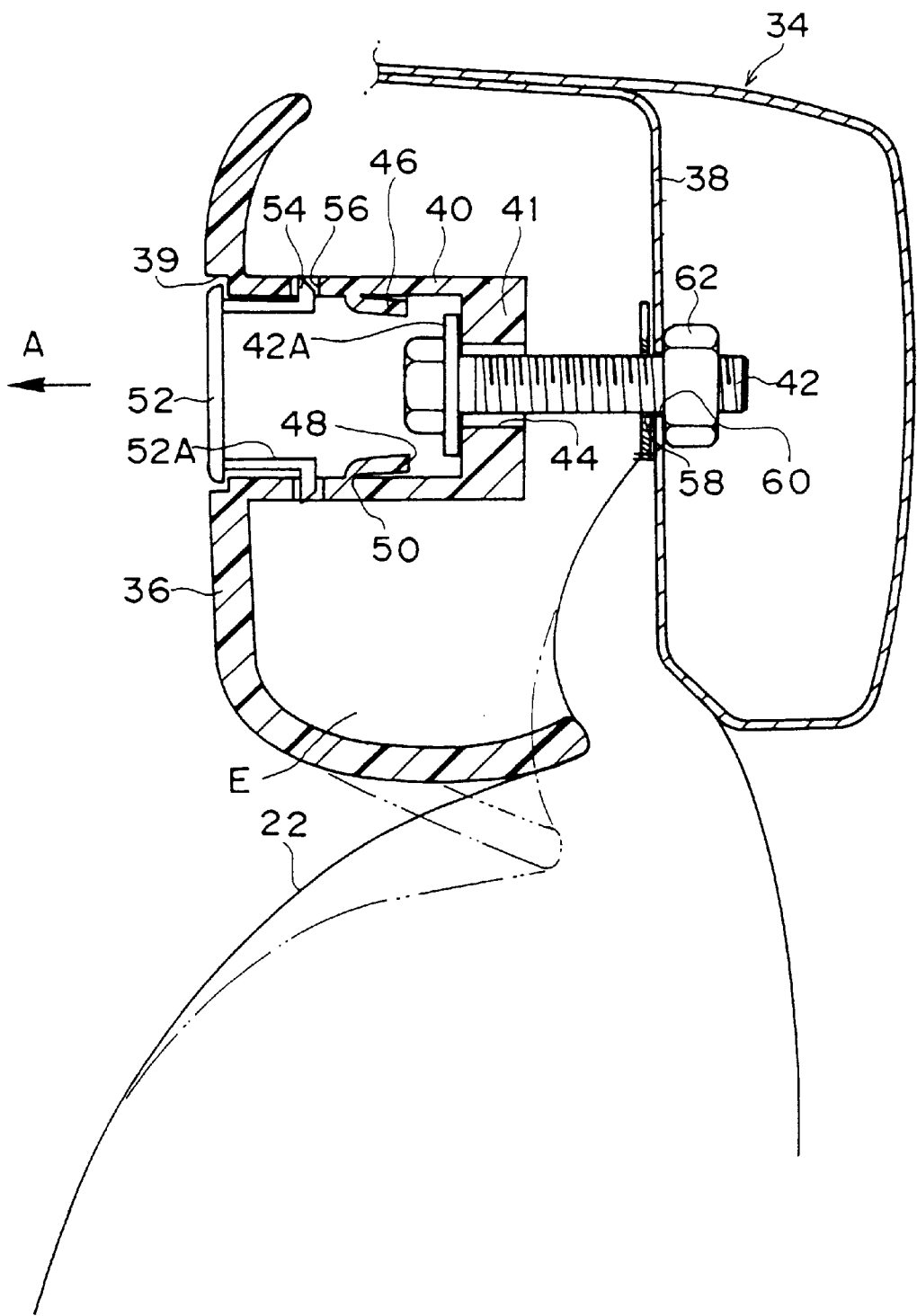
FIG. 4 is an end view of a cross sectional surface along a line 4—4 in FIG. 3.

Further, the garnish 36 rapidly moves to the state shown in FIG. 4 in which the bottom portion 41 of each of the holding members 40 is brought into contact with the flange portion 42A of the fixing bolt 42, due to a relatively small force at an initial stage of the inflation of the air bag 22, and the garnish 36 is caused to be stopped in the direction of being separated from the frame member 38 (in the direction of an arrow A in the drawing). In this case, since the air bag apparatus is provided at the inside walls in the vehicle, the air bag apparatus can sufficiently be actuated with the relatively small expansion force for inflating the air bag 22 even when the gas pressure for inflating the air bag is relatively small, thereby properly operating. In the state shown in FIG. 4, the air bag 22 being expanded toward the interior of the vehicle is inflated and expanded from the gap between an edge portion forming the housing space E of the garnish 36 and the frame member, thereby reaching the inflated and expanded state shown in FIG. 3 and entering in a state for use capable of absorbing the kinetic energy of the occupant.

Further, as shown in FIG. 4, a motion stroke defined by a distance between the partition plate 46 and the bottom portion 41 is set such that the gap between the garnish 36 and the frame member 38 is a suitable size enabling smooth inflation of the air bag 22 when the air bag 22 inflates outwards from the housing space E. At this time, if the garnish 36 is made of a deformable material or has a deformable structure, the motion stroke of the garnish 36 is set by taking into consideration the fact that an end portion of the garnish 36 temporarily deforms as shown by an imaginary line in FIG. 4 so as to widely spread out the gap. Further, in order to spread out the gap more widely, it is possible to include a hinge mechanism in the structure. Still further, the structure may be made in such a manner that the garnish 36 is moved in the direction of the arrow A in the drawing by another driving means at the time of the inflation and expansion of the air bag 22.

Figure 7A:
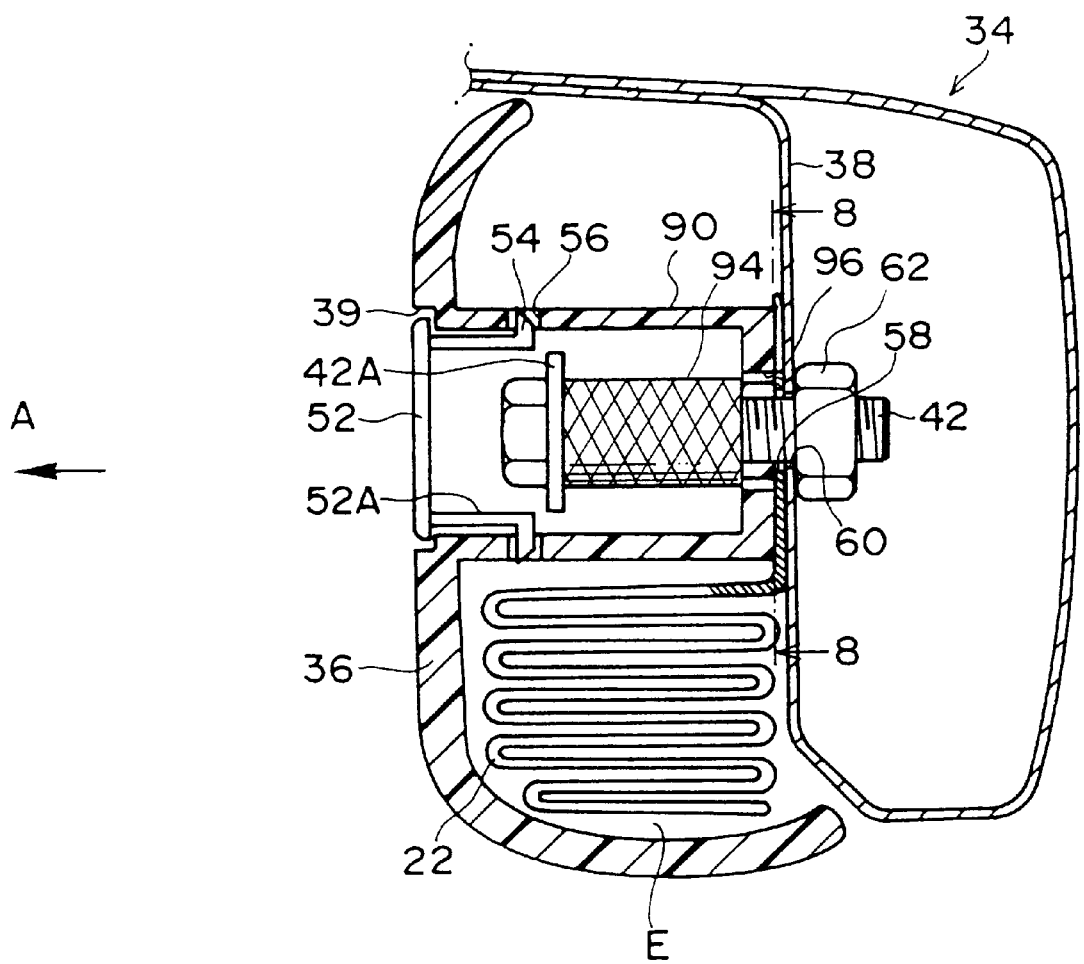
FIG. 7A is an end view of a cross sectional surface of another embodiment of the present invention.
Figure 7B:
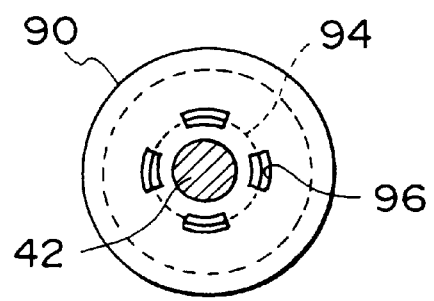
FIG. 7B is a cross sectional view taken along the line 8—8 in FIG. 7A.
Figure 8:
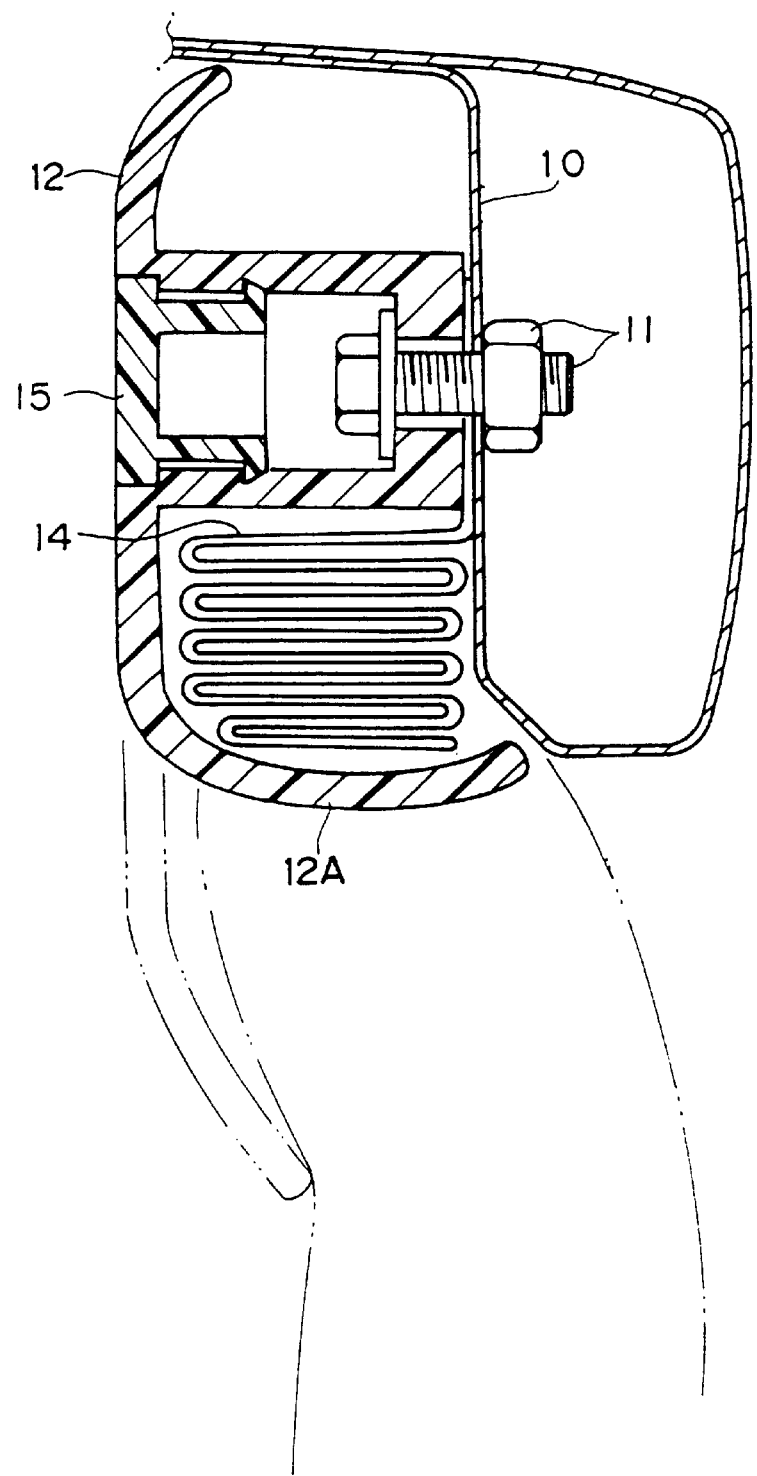
FIG. 8 is an end view of a cross sectional surface of a main portion which exemplifies a mounting state of a conventional air bag apparatus.

Alternatively, as shown in FIG. 7A, a fixing bolt 94 may have a small diameter portion and a large diameter portion to form a stepped portion. The small diameter portion of the fixing bolt 94 penetrates the bottom portion of the holding member 90 and the frame member 38 so as to press and hold the air bag between the bottom portion of the holding member 90 and the frame member by using a nut screwed onto the small diameter portion of the fixing bolt 94, and a plurality of slits are provided in the bottom portion of the holding member 90 as shown in FIG. 7B, which is a cross sectional view taken along line 8—8 in FIG. 5A, so that the bottom portion is easily broken by the inflating force of the air bag and the garnish is separated from the frame member so as to enable the air bag to expand externally.

Next, a second embodiment of the present invention will be described below with reference to FIGS. 5 and 6. The second embodiment is structured such that the bolt for fixing the holding portion of the garnish 36 is commonly used as a bolt for fixing an assist.

For this purpose, each of the holding members 64 in the garnish 36 is formed in a hollow cylinder, and the partition plate 46 having the breakable portion 50 is integrally provided in an opening facing the interior side of the garnish 36 of the vehicle. Further, a bottom surface aperture 66 formed as a bottom portion by slightly drawing the end portion so as to form a step shape is provided in an opening in the side of the frame member 38 of the holding member 64.

Further, the distance in the depthwise direction from the partition plate 46 of each of the holding members 64 to the bottom surface aperture 66 is formed so as to be substantially equal to the moving distance of the garnish 36 at the time of the inflation and expansion of the air bag 22, and thus, the distance is shorter than the holding member 64 shown in FIGS. 1 to 4 mentioned above. Namely, as shown in FIG. 6, the distance from the surface of the garnish 36 at the interior side of the vehicle to the bottom surface aperture 66 is formed so as to be short. A convex table portion 68 formed at a predetermined portion of the frame member 38 in a convex table shape is brought into contact with the bottom surface aperture 66. In this case, the through hole 60 for inserting the fixing bolt 42 is formed in the convex table portion 68.

A housing wall 70 continuously bent from the convex table portion 68 is formed in the frame member 38 so as to be spaced apart from the garnish 36 and form a housing space E having a predetermined size. A side edge portion 36A in the opposite side in the longitudinal direction to the side forming the housing space E of the garnish 36 faces a member 72 in the side of a roof within the interior of the vehicle. Foot portions 76 on both ends of an assist 74 are respectively fixed to the predetermined holding members 64 adjacent to each other in the garnish 36.

Figure 5:
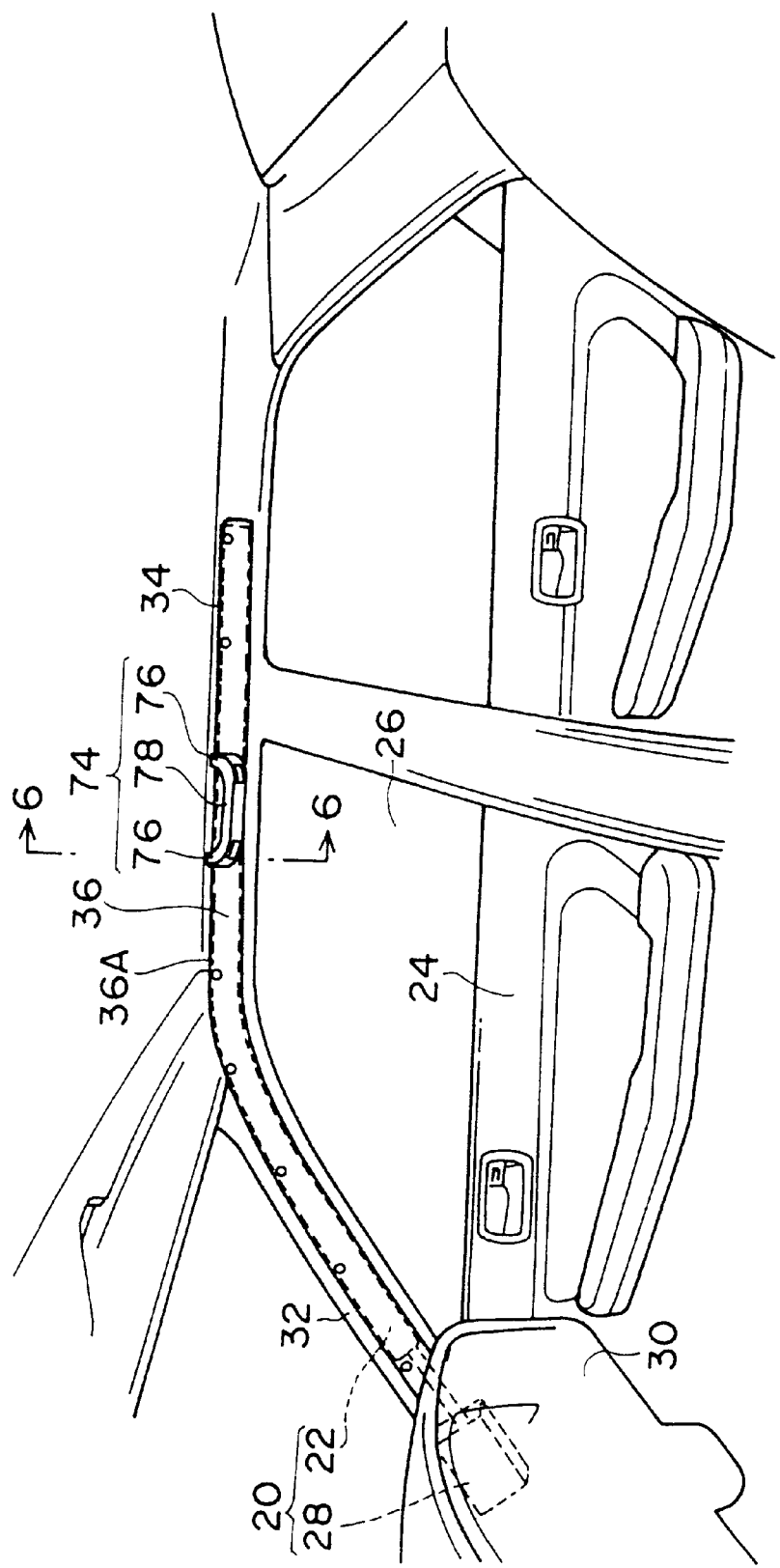
FIG. 5 is a front view of a main portion of an interior of a vehicle which shows a state before an air bag apparatus according to a second embodiment of the present invention is actuated.

As shown in FIG. 5, the assist 74 is wholly formed in a substantially U shape, and is formed in such a manner that an occupant grips a handle portion 78 disposed in the middle of both foot portions 76 perpendicularly bent and extended from both free ends thereof to support the body of the occupant.

Figure 6:
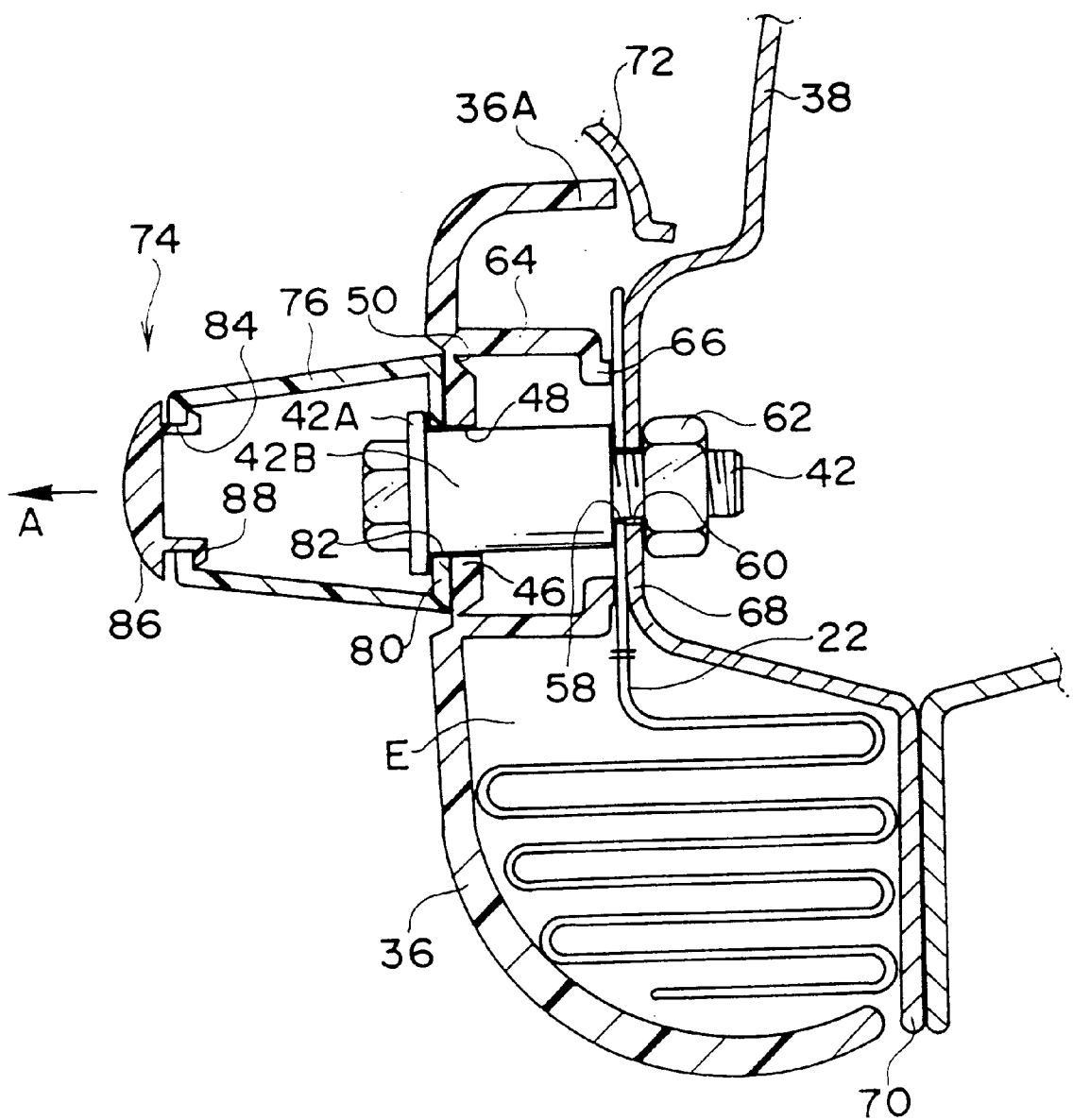
FIG. 6 is an end view of a cross sectional surface along a line 6—6 in FIG. 5.

Also as shown in FIG. 6, each of the foot portions 76 of the assist 74 is formed substantially in a trapezoidal frame shape in cross section, and is formed so as to have a size substantially equal to or smaller than that of the portion in which an outer periphery of a bottom portion 80 at the free end side thereof is surrounded by the breakable portion 50 of the partition plate 46. A through hole 82 for inserting a shaft portion 42B of the fixing bolt 42 which is a shoulder bolt is formed at the center of the bottom portion 80 of the assist 74. Further, the foot portion 76 is formed so as to be forward tapered from the bottom portion 80 toward the handle portion 78.

An opening 84 for inserting the entire fixing bolt 42, when mounting the bolt 21, is formed right above the through hole 82 of each of the bottom portions 80 in the assist 74, and a lid member 86 is detachably engaged with the opening 84 by an engaging hook member 88. Further, in accordance with this second embodiment, the air bag 22 is interposed between the shaft portion 42B of the fixing bolt 42 and the nut 62, thereby fixing the air bag 22 to the frame member 38.

In order to mount the air bag 22, the garnish 36 and the assist 74 in the manner mentioned above to the vehicle body, first, the air bag 22 is placed on the convex table portion 68 of the frame member 38 and the through hole 58 and the through hole 60 are mutually aligned with each other. Further, the garnish 36 is placed thereon, and the bottom aperture 66 of the holding member 64 is brought into contact with the air bag 22. Each of the foot portions 76 of the assist 74 is placed on each of the predetermined adjacent holding members 64 of the garnish 36, and the. through hole 82 of the bottom portion 80 is aligned with the through hole 48 of the partition plate 46.

In the state mentioned above, each of the fixing bolts 42 is inserted from the top-end-threaded portion through the through holes 82 and 48 from each of the openings 84 of the assist 74 and through the through holes 58 and 60 so as to penetrate there through, the shaft portion 42B is brought into contact with the air bag 22, and the nut 62 is meshed with the extending threaded portion of the bolt, thereby fixing the members in the manner as shown in FIG. 6.

In this fixed state, the convex table portion 68 and the air bag 22 are held between the shaft portion 42B of the fixing bolt 42 and the nut 62 meshed with the threaded portion so that only the convex table portion 68 and the air bag 22 are independently fixed, the flange portion 42A of the fixing bolt 42 is brought into contact with the bottom portion 80 of the assist 74 and is fixed by press-contacting the bottom surface aperture 66 of the holding member 64 through the partition plate 46 in contact with the bottom portion 80 to the convex table portion 68 through the air bag 22, thus supporting the garnish 36 and the assist 74 are supported to the frame member 38. In this case, after the mounting operation mentioned above, the lid member 86 is engaged with the opening 84, thereby making the fixing bolt 42 invisible from the interior of the vehicle.

Next, the functions and effects of the air bag apparatus in accordance with the second embodiment structured in the manner mentioned above will be described. When the air bag apparatus is actuated and the gas is ejected from the inflator 28 into the air bag 22 so that the air bag 22 starts expanding, the garnish 36 is pushed outwards in the direction of the arrow A in FIG. 6. Then, the partition plate 46 is broken at the breakable portion 50 due to this action, the garnish 36 moves in the direction of the arrow A, and the bottom surface aperture portion 66 of each of the holding members 64 is pressed by the bottom portion 80 of the assist 74, thereby stopping the movement. The gap, formed by this operation, between the garnish 36 and the housing wall portion 70 of the frame member 38 is expanded with the help of the deformation of the garnish 36, and the air bag 22 is expanded outwards from a wide gap, and inflates and expands to reach a predetermined state where it can be used.

In this case, since the structures, functions and effects other than those mentioned above in accordance with the second embodiment are the same as those of the first embodiment mentioned above, a detailed description thereof will be omitted.

As mentioned above, according to the air bag apparatus of the present invention, the structure is simply made, the apparatus can be easily assembled and manufactured, and further, there can be obtained an excellent effect that when the air bag apparatus is actuated so as to inflate and expand the air bag, the air bag can be rapidly pushed out and inflated by a relatively weak force so as to be expanded outwards.

What is claimed is:

1. An air bag apparatus which absorbs the kinetic energy of an occupant of a vehicle by an air bag which is inflated and expanded by being charged with a gas, comprising:

a cover member for housing the air bag in a folded state;

a fixing element which has an enlarged head portion at one end portion thereof and which is attached to a fixing member at a vehicle body side at another end portion thereof;

hollow cylindrical holding members provided on the cover member so that the one end portion of the fixing element is movably inserted into each holding member;

a partition projecting inwards in a holding, portion of the hollow cylinder in such a manner that the partition abuts an enlarged head portion of the fixing element when the cover member is positioned for housing the air bag, and the enlarged head portion of the fixing element is disengaged from the partition when inflating force of the air bag is applied to the cover member; and a bottom portion, projecting inwards in the holding portion of the hollow cylinder, which is brought into contact with the enlarged head portion of the fixing element when the cover member is moved to a position where the air bag is inflated outward to hold the cover member so as not to be disengaged.

2. An air bag apparatus comprising an air bag disposed between a location of an occupant of a vehicle and a side wall of a vehicle so as to inflate on a vehicle interior side of the side wall of the vehicle comprising:

a cover member for covering a side of the air bag facing the interior of the vehicle, wherein the air bag is disposed inside the side wall of the vehicle in a contracted state;

a fixing element which has an enlarged head portion at one end portion thereof and which is attached to a fixing member at a vehicle body side at another end portion thereof;

hollow cylindrical holding members provided on the cover member so that the one end portion of the fixing element is movably inserted into each holding member;

a partition projecting inwards in a holding portion of the hollow cylinder in such a manner that the partition abuts an enlarged head portion of the fixing element when the cover member is positioned for housing the air bag, and the enlarged head portion of the fixing element is disengaged from the partition when inflating force of the air bag is applied to the cover member; and a bottom portion, projecting inwards from each of the holding members which is brought into contact with the enlarged head portion of the fixing element when the cover member is moved to a position where the air bag is inflated outward to hold the cover member so as not to be disengaged.

3. An air bag apparatus which absorbs the kinetic energy of an occupant of a vehicle having a frame member extending from a front body pillar towards a roof in an interior of the vehicle by an air bag which is inflated and expanded by being charged with a gas ejected from an inflator due to an actuation of the inflator, comprising:

a garnish arranged so as to correspond to the frame member of a vehicle and which houses the air bag in a folded state;

hollow cylindrical holding members having a bottom portion thereof in a plurality of portions of the garnish and having a partition at a position separated from the bottom portion of the hollow cylinder; and a fixing element for penetrating the bottom portion of each holding member, the partition, and the frame member and is disposed in a fixed state where the fixing element abuts the partition and the frame member and holds the garnish in an air bag housing position where the garnish contacts the frame member, and after the garnish has been separated from the partition due to inflation and expansion of the air bag externally of the air bag housing, the fixing element abuts the bottom portion of the holding member and holds the bottom portion of each holding member and the frame member in a fixed position.

4. An air bag apparatus according to claim 3, wherein the garnish has an elongated partly curved shape extending from the front body pillar to the roof and is formed having an L-shaped cross section, and is disposed so as to form together with the frame member at the vehicle body side of the front body pillar a space for housing the air bag.

5. An air bag apparatus according to claim 3, wherein the fixing element is a fixing bolt provided at the center of the bottom portion of each holding member.

6. An air bag apparatus according to claim 3, wherein each holding member is formed in such a manner that the partition plate is integrally formed in a concentric manner from a predetermined intermediate position in a direction perpendicular to the frame member toward the inside of each holding member in an inner peripheral surface portion of each holding member.

7. An air bag apparatus which absorbs the kinetic energy of an occupant of a vehicle by an air bag which is inflated and expanded by being charged with a gas ejected from an inflator due to actuation of the inflator, comprising:

a garnish similar in shape to a frame member extending from a front body pillar towards a roof in an interior of a vehicle and which houses the air bag in a folded state;

hollow cylindrical holding members located at a plurality of portions of the garnish, each holding member having an aperture with a diameter reduced relative to the diameter of the holding member and located adjacent a side of the vehicle frame member, and a partition at a position separated from the aperture;

an assist provided with a foot portion having a bottom portion smaller than the hollow cylindrical holding member; and a fixing element which penetrates both the frame member and the air bag thereby fixing both, and which holds the garnish in an air bag housing position where the garnish contacts the frame member, and which penetrates the partition and the bottom portion of the assist so as to hold the partition and the bottom portion of the assist at a predetermined distance from each other, and when the fixing element is caused by the inflating force of the air bag to no longer be fixed to the partition, and the garnish moves to a position where the air bag is able to expand externally of the air bag housing, then the aperture abuts the bottom portion of the assist and the fixing element holds the frame member and the aperture via the bottom portion of the assist.

8. An air bag apparatus according to claim 7, wherein a thin breakable portion is formed in a connecting portion between the partition and the holding member along the whole inner periphery thereof, and an engaging hole for engaging an engaging hook of a lid for blocking an opening in the interior side of the vehicle is formed in the assist.

9. An air bag apparatus according to claim 7, wherein the fixing element is a single fixing bolt for fixing the holding member to the frame member and for fixing the assist to the holding member.

10. An air bag apparatus according to claim 8, wherein the aperture in the holding member at the side of the frame member is constituted from an aperture having a smaller diameter than the cylindrical diameter of the holding member and is formed in a stepped shape.

11. An air bag apparatus according to claim 9, further comprising a convex table portion of the frame member with a through hole for inserting the fixing bolt, and wherein a housing wall portion of the frame member is continuously curved from the convex table portion, separated from the garnish and forms a space for housing the air bag having a predetermined size.

12. An air bag apparatus according to claim 11, further comprising the garnish in which foot portions at both ends of the assist are respectively fixed, the assist wholly being formed in a substantially U shape having the foot portions with free ends and a handle portion in the middle of both the foot portions which is curved and extends perpendicularly from both free ends thereof.

13. An air bag apparatus according to claim 11, wherein the fixing bolt has flange, shaft and threaded portions and the convex table portion and the air bag are held between the shaft portion of the fixing bolt and a nut meshed with the threaded portion of the bolt so as to be fixed to the frame member.

14. An air bag apparatus according to claim 13, wherein the garnish is constructed in such a manner that the flange portion of the fixing bolt is brought into contact with the bottom portion of the assist, and the holding member is supported by the frame member through the partition which contacts the bottom portion of the assist.

15. An air bag apparatus according to claim 14, wherein the partition wall has a breakable portion which is broken in a state where the holding member and the assist portion are fixed to the frame member by the fixing bolt at the time of inflation of the air bag due to an actuation of the inflator, whereby the garnish is deformed in the direction of the inside of the vehicle.

16. An air bag apparatus which absorbs the kinetic energy of an occupant of a vehicle by an air bag which is inflated and expanded by being charged with a gas ejected from an inflator due to an actuation of the inflator, comprising:

a garnish similar in shape to a frame member extending from a front body pillar towards the roof in the interior of a vehicle and which houses the air bag in a folded state;

hollow cylindrical holding members having a bottom portion thereof in a plurality of portions of the garnish;

a fixing bolt having a small diameter portion and a large diameter portion to form a stepped portion, wherein the small diameter portion of the fixing bolt penetrates the bottom portion of the holding member and the frame member so as to press and hold the air bag between the bottom portion of the holding member and the frame member by using a nut screwed onto the small diameter portion of the fixing bolt, wherein a plurality of slits are provided in the bottom portion of the holding member so that the bottom portion is broken by the inflating force of the air bag and the garnish is separated from the frame member so as to enable the air bag to expand externally.

* * * * *